United States Patent [19]

Kato et al.

[11] 4,142,031
[45] Feb. 27, 1979

[54] POLYCAPROLACTAM COMPOSITION HAVING IMPROVED MELT SPINNABILITY AND METHOD FOR IMPROVING MELT SPINNABILITY OF POLYCAPROLACTAM

[75] Inventors: Tetsuya Kato, Nagoya; Akira Ishitani; Kiyotomi Kobori, both of Ohtsu, all of Japan

[73] Assignee: Toray Industries, Inc., Tokyo, Japan

[21] Appl. No.: 845,956

[22] Filed: Oct. 27, 1977

[51] Int. Cl.² ............................................. C08G 85/00
[52] U.S. Cl. ............................. 526/4; 260/45.7 R; 264/169; 264/211; 526/74; 528/319
[58] Field of Search ............... 264/211, 300, 349, 169; 260/45.7 R, 45.75 C; 526/4.74; 528/319

[56] References Cited

U.S. PATENT DOCUMENTS

| | | | |
|---|---|---|---|
| 3,080,345 | 3/1963 | Brooks et al. | 260/78 S |
| 3,156,750 | 11/1964 | Cuculo | 284/178 F |
| 3,585,264 | 6/1971 | Thomas | 264/349 |
| 3,907,743 | 9/1975 | Goto et al. | 260/45.75 C |

FOREIGN PATENT DOCUMENTS

| | | | |
|---|---|---|---|
| 44-30007 | 12/1969 | Japan | 264/211 |
| 47-2056 | 1/1972 | Japan | 264/169 |

*Primary Examiner*—Jay H. Woo
*Attorney, Agent, or Firm*—Armstrong, Nikaido, Marmelstein & Kubovcik

[57] ABSTRACT

When magnesium oxide in which the half-width of the X-ray diffraction profile at (200) as determined according to a specific method is at least 0.3 is incorporated in an amount of 0.05 to 2.0% by weight in polycaprolactam, a polycaprolactam composition having an improved spinnability is obtained.

11 Claims, 2 Drawing Figures

POLYCAPROLACTAM COMPOSITION HAVING IMPROVED MELT SPINNABILITY AND METHOD FOR IMPROVING MELT SPINNABILITY OF POLYCAPROLACTAM

BACKGROUND OF THE INVENTION

The present invention relates to a polycaprolactam composition having an improved melt spinnability.

When polycaprolactam is melt-spun for a long time, thermal degradation or decomposition products such as tar are deposited and accumulated on the edge of a spinneret nozzle. This tar causes a so-called "bending" phenomenon in which an extruded molten polymer is bent in a direction different from the yarn take-up direction, resulting in enhancement of unevenness in the resulting yarn and increase of yarn breakages. This tar product is formed according to the following mechanism. Namely, a monomer (ε-caprolactam), oligomers or a thermal decomposition product of the polymer present in molten polycaprolactam volatilizes or sublimates during melt spinning and is oxidized on the surface of a spinneret.

As means for preventing formation of this tar product, Japanese Patent Publication No. 30007/69 discloses a process in which various additives, for example, organic tin compounds such as tetra-amyl tin and tetra-benzyl tin, are incorporated in polycaprolactam. Further, U.S. Pat. No. 3,907,743 teaches a method in which 0.001 to 0.05% by weight of $Mg(CH_3COO)_2$, $MgCl_2$, $MgBr_2$ or $Mg(NO_3)_2$ and 0.05 to 5% by weight o an organic tin compound are incorporated in a polyamide and the resulting composition is melt-spun, thereby to reduce build-up of carbonized materials on the surface of a spinneret during spinning of a synthetic linear polyamide.

Most of these known additives are still insufficient in the effect of preventing accumulation of tar or carbonized materials and thus preventing occurrence of the bending phenomenon, and even if some of them are effective, they are poisonous. Moreover, incorporation of these additive often results in degradation of properties of polycaprolactam. Therefore, various difficulties should be overcome in order to put these additives into practical use.

Objects of the Invention

It is a primary object of the present invention to provide a polycaprolactam composition comprising a compound which can easily be handled and is not poisonous and which can prevent occurrence of "bending" in a yarn during melt spinning and also prevent subsequent enhancement of unevenness in the yarn and increase of yarn breakages without having bad influence on the resulting polycaprolactam yarn.

Another object of the present invention is to establish a method for improving the melt spinnability of polycaprolactam.

BRIEF SUMMARY OF THE INVENTION

The foregoing and other objects of the present invention can be attained by a polycaprolactam composition comprising polycaprolactam and, incorporated therein, 0.05 to 2.0% by weight of magnesium oxide in which the half-width of the X-ray diffraction profile at (200) as determined according to a specific method described hereinafter is at least 0.3.

Compositions comprising a polyamide and magnesium oxide are disclosed in U.S. Pat. Nos. 3,080,345 and 3,897,346. However, in the composition of U.S. Pat. No. 3,080,345 the magnesium oxide is used as a nucleating agent and U.S. Pat. No. 3,897,346 teaches that the magnesium oxide is used as a fire retardant additive. In each of these conventional techniques, the particle size of the magnesium is specified, but it is a morphological size that can be discriminated by a microscope and the crystallite size specified in the present invention is not mentioned at all.

DETAILED DESCRIPTION OF THE PREFERRED EMBODIMENTS

Figure 1:
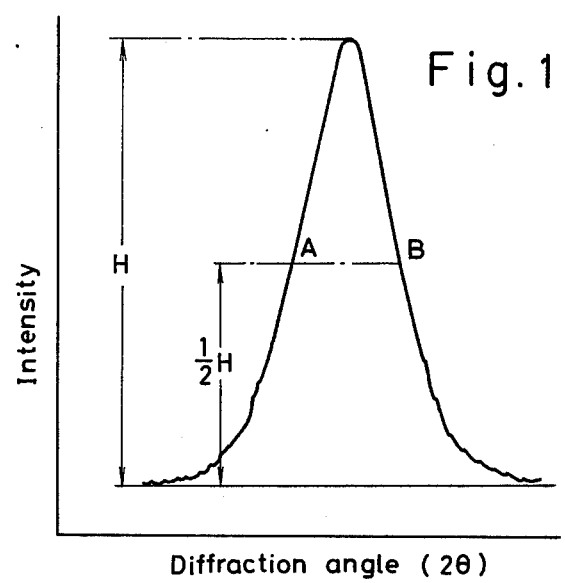

The present invention is effective only for polycaprolactam, and no substantial effect of improving melt spinnability can be attained when the present invention is applied to other polyamides such as polyhexamethylene-adipamide, polyhexamethylene-sebacamide and polyhexamethylene-undecamide.

The polycaprolactam to which the present invention is applied is a polymer that can be melt-spun at a temperature lower than 280° C. This polycaprolactam includes a homopolymer having a degree of polymerization corresponding to a relative viscosity of 2.0 to 2.80 as measured at 25° C. in 98 Wt.% $H_2SO_4$. Other polyamides, for example polyhexamethylene-adipamide, polyhexamethylene-isophthalamide or the like, may be incorporated in an amount of up to 50% by weight into such polycaprolactam by means of copolymerization or blending.

Especially good results are obtained when the present invention is applied to polycaprolactam having a high terminal amino group concentration. Polycaprolactam having a high terminal amino group concentration is insufficient in heat stability and when it is melt-spun, it promptly decomposes to form large quantities of the monomer, oligomers and low molecular weight fragments. These thermal decomposition products contaminate the edge of a spinneret nozzle. When the present invention is applied, a very high effect of improving the melt spinnability can be attained with respect to polycaprolactam having a terminal amino group concentration of at least $5 \times 10^{-5}$ mole per gram of the polymer. Of course, the intended effect of improving the melt spinnability can simiarly be attained when the present invention is applied to polycaprolactam having a lower terminal amino group concentration.

Magnesium oxide that is effectively used in the present invention is a fine particle characterized in that the half-width of the X-ray diffraction profile at (200) as determined according to a specific method described hereinafter is at least 0.3, preferably 0.4 to 0.9. When magnesium oxide is incorporated into polycaprolactam and the resulting composition is melt-spun into filaments, if the length of fine particulate magnesium oxide is smaller than ⅓ of the filament diameter, melt spinning is possible. When it is intended to prepare textile yarns, if the diameter of the fine particulate magnesium oxide to be incorporated into polycaprolactam is smaller than several microns, this intended object can be attained. However, in order to attain the intended effect of the present invention, namely the effect of preventing contamination of the edge of a spinneret nozzle, it is indispensable that not the morphological size that can be discriminated by a microscope but the crystallite size that can be discriminated by the X-ray diffractometer should be smaller than a certain value.

The morphological size is not always in direct proportion to the crystallite size. In other words, some particles having a large morphological size have a small crystallite size.

The crystallite size is determined from the X-ray diffraction profile according to the following formula of Scherrer:

$$D = K\lambda/\beta \cos \theta \qquad (1)$$

wherein D stands for the size (Å) of the crystallite in the direction perpendicular to the measurement face, K designates the shape factor (constant), $\lambda$ represents the wave length of the X-ray, $\theta$ stands for the diffraction angle, and $\beta$ designates the half-width.

Magnesium oxide takes a form of a cubic crystal, and the crystallite size thereof is determined by the value of $\beta$, namely the half-width. A larger half-width means a smaller crystallite size.

Ideally the value of $\beta$ depends only on the crystallite size, but in actual measurements, the value of $\beta$ is influenced by a measurement instrument and the like. Accordingly, in order to conduct the measurement strictly, measurement conditions that will minimize these influences are adopted and also a crystal that can be regarded as having an indefinite crystallite size is subjected to the measurement under the same conditions to determine the influences of the measurement equipment, based on which the found value is corrected. The correction can be conducted according to known methods, for example, Warren's method, Jones' method and Fourier's method. In each method, correction is possible if the X-ray diffraction profile of the ideal crystal is known. If appropriate measurement and conditions are adopted, the difference is very small among the corrected values obtained according to these methods. Corrected values can easily be obtained by slightly sliding found values.

In the present invention, silicon single crystal having a high purity (99.999% or higher) and free of distortion is used as the ideal crystal and the instrument is adjusted so that the half-width at (220) in the diffraction profile by Cu-K$\beta$ ray is 0.07°–0.08°. Under these conditions, the half-width at (200) of magnesium oxide is measured. Only fine particles of magnesium oxide having a crystallite size of at least 0.3 as determined according to this method are effective for preventing contamination of the edge of a spinneret nozzle.

The half-width is read from the X-ray diffraction profile in the following manner.

Figure 2:
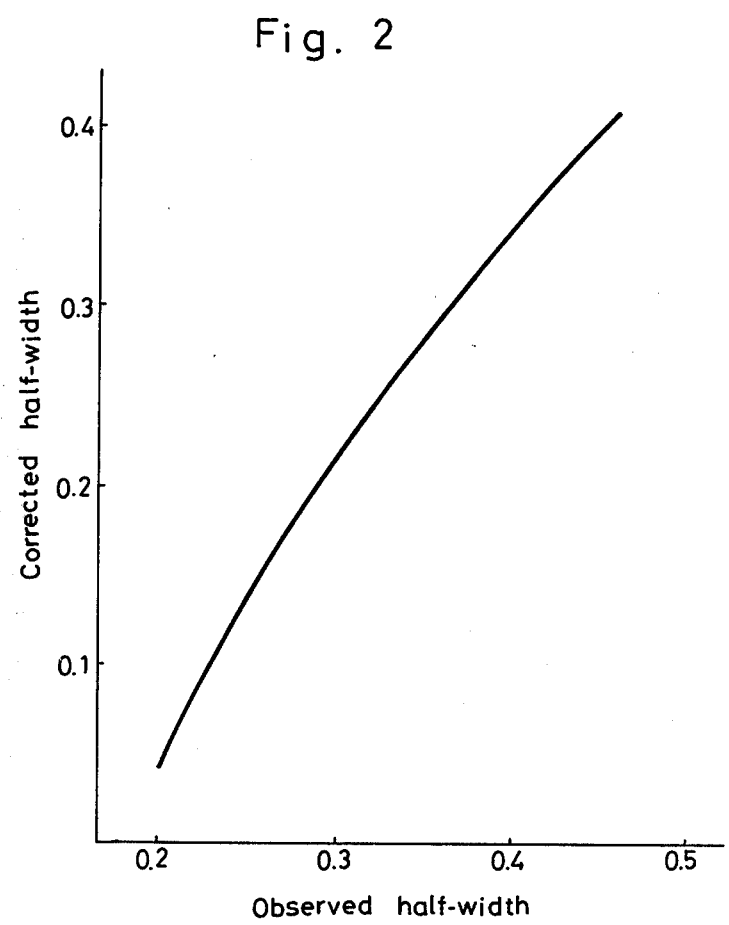

The relation between the diffraction angle ($\theta$) and the intensity is as illustrated in FIG. 1. The half-width is defined as the width AB between points A and B where the peak value in the profile of FIG. 1 is reduced to ½. Since a relation as shown in FIG. 2 is established between the thus measured found value and the value corrected according to Jones' method, the found value is corrected according to the relation shown in FIG. 2 and the crystallite size is calculated from the corrected value according to the above formula (1).

A specific example of the measurement will now be described.

An X-ray diffractometer manufactured by Rigaku Denki K.K. is used. It includes an X-ray generator Model D-8C, a goniometer Model 2155D, a scintillation counter as the detector and a recorder Model 5055. The applied X-ray is a Cu-K$\epsilon$ ray passed through a Nickel-filter. The voltage and current of the generator are adjusted to 40 KV and 20–40 mA, respectively. The slit is characterized by a divergence angle of 1°, a receiving length of 0.15 mm and a scattering angle of 1°. The scanning speed is adjusted to ¼°/min.

Incorporation of magnesium oxide into polycaprolactam is accomplished by any of customary methods, so far as magnesium oxide is uniformly blended in polycaprolactam. In general, predetermined amount of magnesium oxide powder is added directly or with a diluent to pellets of polycaprolactam. A method in which magnesium oxide is added to $\epsilon$-caprolactam or its aqueous solution before polymerization thereof is not preferred, because the degree of polymerization of resulting polycaprolactam is lowered and magnesium oxide is converted to magnesium hydroxide, resluting in drastic reduction of the intended melt spinnability-improving effect.

The polycaprolactam composition of the present invention may be shaped into fibers according to costomary methods. The kind or type of the apparatus to be used for melt spinning is not particularly critical, but it is indispensable that the spinning temperature should not exceed 280° C. At a higher temperature, the intended effect of preventing contamination of a spnneret nozzle is drastically reduced.

Magnesium oxide is incorporated in polycaprolactam in an amount of 0.05 to 2.0% by weight based on the resulting composition. When the amount incorporated of magnesium oxide is smaller than 0.05% by weight, no substantial effect can be attained. When the amount incorporated of magnesium oxide is larger than 2.0% by weight, preferable properties inherent to polycaprolactam, such as high yarn tenacity, high elongation, high transparency and good luster, are degraded. Further, there are caused undesirable phenomena such as clogging of the filter in a spinning assembly during melt spinning and increase of yarn breakage. An optimum amount of magnesium oxide to be added is determined depending on the particle size of magnesium oxide used and required properties of the product yarn. In general, it is preferred that magnesium oxide be incorporated in an amount of 0.08 to 0.2% by weight.

In the present invention, the melt spinnability of polycaprolactam is improved by incorporation of magnesium oxide according to the following mechanism.

Magnesium oxide incorporated in polycaprolactam reacts with molten polycaprolactam and water contained therein in a minute amount to inhibit decomposition of polycaprolactam. As a result, formation of the monomer and other low molecular weight fragments causing contamination of the edge of a spinneret nozzle is remarkably reduced.

A polyorganosiloxane is often coated on the surface of a spinneret. In the case, since the above-mentioned low molecular weight fragments are dissolved in the polyorganosiloxane and they are accumulated and thermally decomposed, deposition and accumulation of carbonized materials such as tar are accelerated. Magnesium oxide has also an effect of inhibiting thermal degradation or decomposition of such low molecular weight fragments deposited on the edge of a spinneret nozzle and therefore, the intended effect of the present invention can be enhanced.

In the present invention, other additives such as delustering agents, stabilizers, antistatic agents and dyes may be added together with magnesium oxide to polycaprolactam, and their activities can be effectively exerted.

The present invention will now be described in detail by reference to the following Examples that by no means limit the scope of the invention.

EXAMPLE 1

According to a customary method, ε-caprolactam containing 15% by weight of water was polymerized to obtain pellets. The pellets were treated in hot water maintained at 98° C. to remove unreacted ε-caprolactam and oligomers. The so obtained polycaprolactam contained 1.0% by weight of oligomers, and the relative viscosity was 2.61 as measured at 25° C. in 98 Wt.% $H_2SO_4$ and the terminal amino group concentration was $4.6 \times 10^{-5}$ mole per gram of the polymer. Then, magnesium oxide powders differing in the crystallite size determined according to the X-ray diffractometer described in the text of the specification were separately incorporated into the above polycaprolactam pellets. In each case, the amount incorporated of the magnesium oxide powder was 0.09% by weight. The resulting pellets were fed to an extruder and molten at 270° C., and the molten polycaprolactam composition was extruded in the form of a filament at a rate of 21.5 g/min through a spinneret having 24 nozzles of a Y-shaped cross-section and wound up at a rate of 1000 m/min. Melt spinning was continued under these conditions for 10 days, and contamination of the edge of the spinneret nozzle and occurrence of yarn breakage were examined to obtain results shown in Table 1.

Polymethylphenylsiloxane (manufactured by Shinetsu Kagaku Kogyo K.K.) was coated on the spinneret surface in advance, and every time yarn breakage took place, the spinneret surface was cleaned by a wire brush and polymethylphenylsiloxane was coated again.

When magnesium oxide powders (samples C, D, E and F in Table 1) having a half-width larger than 0.3 at (200) and a small crystallite size were incorporated in polycaprolactam, even if the amount incorporated was as small as 0.09% by weight, a high effect of preventing accumulation of tar and other carbonized materials around the spinneret nozzle edge could be attained and the frequency of occurrence of yarn breakage was reduced to ⅛ of the yarn breakage occurrence frequency in control sample A free of magnesium oxide.

Magnesium powder (sample B) having a half-width smaller than 0.30 at (200) and a large crystallite size did not substantially exert the above effect when incorporated in polycaprolactam, and the frequency of occurrence of yarn breakages was not substantially different from the yarn breakage occurrence frequency in control sample A free of magnesium oxide.

The amount incorporated of this magnesium oxide (sample B) was increased to 1% by weight and melt spinning was carried out under the above-mentioned conditions. The effect of inhibiting contamination of the spinneret nozzle edge was slightly enhanced, but because of clogging of a filter in the spinning assembly and increase of the yarn unevenness, it was substantially impossible to continue the melt spinning operation.

Table 1

|  | Samples | | | | | |
|---|---|---|---|---|---|---|
|  | A | B | C | D | E | F |
| Half-width (200) | — (not added) | 0.28 | 0.32 | 0.42 | 0.65 | 0.90 |
| Accumulation of tar around nozzle edge after 10-day operation | very much | much | medium | little | trace | trace |

Table 1-continued

|  | Samples | | | | | |
|---|---|---|---|---|---|---|
|  | A | B | C | D | E | F |
| Yarn breakage occurrence frequency (per spinneret per day) | 1.6 | 1.4 | 0.6 | 0.3 | 0.2 | 0.2 |

EXAMPLE 2

Magnesium oxide (sample E in Table 1) having a small crystallite size, which had been found effective in Example 1, was incorporated in various amounts into polycaprolactam, and the resulting compositions were melt-spun in the same manner as described in Example 1 and contamination of the spinneret and occurrence of yarn breakages were examined to obtain results shown in Table 2.

Table 2

|  | Samples | | | | | |
|---|---|---|---|---|---|---|
|  | G | H | I | J | K | L |
| MgO Amount (% by weight) | 0.001 | 0.04 | 0.1 | 1.0 | 2.0 | 5.0 |
| Accumulation of tar around nozzle edge after 10-day operation | very much | much | trace | trace | trace | trace |
| Frequency of yarn breakage occurrence (per spinneret per day) | 1.5 | 0.9 | 0.3 | 0.2 | 0.3 | 1.2 |

From the results shown in Table 2, it is seen that if the amount of magnesium oxide incorporated into polycaprolactam was smaller than 0.05% by weight, the effect of preventing contamination of the spinneret nozzle could not be improved. When the amount of magnesium oxide exceeded 2.0% by weight, contamination of the spinneret nozzle was reduced, but because of conspicuous clogging of the filter it was substantially impossible to continue the melt spinning operation and occurrence of yarn breakages was rather increased. Thus, it has been confirmed that an optimum amount of magnesium oxide incorporated in polycaprolactam is in the range of from 0.05 to 2.0% by weight.

EXAMPLE 3

Pellets of polycaprolactams differing in the degree of polymerization and the terminal amino group concentration were prepared according to a customary method. Namely, polymers having relative viscosities of 2.68, 2.59 and 2.71 as measured at 25° C. in 98 Wt.% $H_2SO_4$ and terminal amino acid concentrations of 3.0, 5.5 and 7.9 mole/g, respectively, were prepared. The pellets were washed with hot water to remove the unreacted monomer and oligomers. After washing, the oligomer content was 1% by weight in each sample. Then, magnesium oxide having a half-width at (200) of 0.95 as determined by the above-mentioned X-ray diffractometer was incorporated in each sample in an amount of 0.13% by weight. Each of the resulting compositions was melt-spun at 265° C. by using a spinneret having 17 nozzles of a Y-shaped cross-section. Namely, the polycaprolactam composition was extruded at a rate of 13 g/min in the form of a filament and wound up at a rate of 1050 m/min. The melt spinning operation was continued under these conditions for one week. For comparison, pellets of polycaprolactam free of magnesium oxide were similarly melt-spun. Contamination of the spinneret nozzle and frequency of occurrence of yarn breakages were examined to obtain results shown in Table 3.

In case of polycaprolactam having a high terminal amino group concentration, accumulation of tar around the spinneret nozzle edge was conspicuous and the yarn breakage occurrence frequency was so high that normal melt spinning operation could not be continued. However, these defects could be substantially eliminated by incorporation of magnesium oxide and the melt spinnability could be remarkably improved.

Table 3

|  | Samples | | | | | |
| --- | --- | --- | --- | --- | --- | --- |
|  | M | N | O | P | Q | R |
| Terminal amino group concentration (mole/g) | 3.0 | 3.0 | 5.5 | 5.5 | 7.9 | 7.9 |
| MgO content (% by weight) | 0 | 0.13 | 0 | 0.13 | 0 | 0.13 |
| Accumulation of tar around spinneret nozzle edge after 1-week operation | much | trace | much | trace | very much | trace |

What is claimed is:

1. A polycaprolactam fiber consisting essentially of a polycaprolactam composition comprising polycaprolactam and, incorporated therein, 0.05 to 2.0% by weight of magnesium oxide in which the half-width of the X-ray diffraction profile at (200) as determined according to the method described in the text of the specification is at least 0.3.

2. A polycaprolactam composition having an improved melt spinnability comprising polycaprolactam and, incorporated therein, 0.05 to 2.0% by weight of powdered magnesium oxide having a particle size smaller than ½ the diameter of the filament into which the composition is to be spun, in which the half-width of the X-ray diffraction profile at (200) as determined according to the method described in the text of the specification is at least 0.3.

3. A polycaprolactam composition as set forth in claim 1 wherein said half-width at (200) is 0.4 to 0.9.

4. A polycaprolactam composition as set forth in claim 1 wherein the amount incorporated of magnesium oxide is 0.08 to 0.2% by weight.

5. A polycaprolactam composition as set forth in claim 1 wherein the polycaprolactam is substantially a homopolymer of $\epsilon$-caprolactam.

6. A polycaprolactam composition as set forth in claim 1 wherein the relative viscosity of the polycaprolactam is 2.0 to 2.8 as measured at 25° C. in 98 Wt.% $H_2SO_4$.

7. A polycaprolactam composition as set forth in claim 1 wherein the terminal amino group concentration of the polycaprolactam is at least $5 \times 10^{-5}$ mole/g of the polymer.

8. An improved process for melt spinning of polycaprolactam which comprises melt-spinning from a spinneret a polycaprolactam composition comprising polycaprolactam and, incorporated therein, 0.05 to 2.0% by weight of magnesium oxide in which the half-width of the X-ray diffraction profile at (200) as determined according to the method described in the text of the specification is at least 0.3.

9. A melt spinning process according to claim 8 wherein the melt spinning is carried out at a temperature not higher than 280° C.

10. A melt spinning process according to claim 8 wherein powdery magnesium oxide is incorporated into pellets of polycaprolactam.

11. A melt spinning process according to claim 8 wherein the terminal amino group concentration of the polycaprolactam is at least $5 \times 10^{-5}$ mole/g of the polymer.

* * * * *